3,151,169
BORON-CONTAINING CARBINOLS
Marion F. Hawthorne and Samuel F. Reed, Jr., Huntsville, Ala., assignors to Rohm & Haas Company, Philadelphia, Pa., a corporation of Delaware
No Drawing. Filed Mar. 24, 1961, Ser. No. 98,265
7 Claims. (Cl. 260—606.5)

This invention concerns carbinols with high boron content and processes for the manufacture of said carbinols. More particularly, it concerns secondary alcohols with high boron content.

Boron compounds are of particular interest as components of propellant charges, such as are used in missiles, rockets, etc., because they are high energy compounds, and, when used with oxidizers and other additives, provide very high specific impulse, a much sought after characteristic. However, the simpler boron compounds tend to be unstable, and more stable boron compounds have long been sought.

While it would be possible to incorporate stable boron compounds into propellant compositions without chemically reacting the boron compounds with the other components of the propellant charge, there are serious limitations to the amount of a boron-containing compound which can be incorporated if it does not react to form a polymeric compound with good physical properties. There are definite lower limits to the physical properties which a propellant grain must possess, and, because of the necessity for using high proportions of an oxidizer such as ammonium perchlorate, many of the propellant grains presently used are not substantially above these minimum requirements. Thus, the addition of any appreciable amount of boron-containing compounds which do not contribute to the physical strength of the grain is frequently impossible. Boron-containing compounds which would yield polymers having good physical properties by polymerization or by condensation reactions would therefore be most desirable.

One preferred method of making propellant "grains" or charges consists in casting a mixture of various additives plus a compound, which can be termed a "Monomer," which will subsequently form an elastic tough rubbery polymer by condensation or polymerization reactions and function as a binder for the entire propellant charge. This method permits uniform dispersion of all components throughout the propellant mass and, more important, permits casting the mixture into casings or molds at relatively low safe temperatures. Obviously, with potentially explosive or highly combustible mixtures such as must be used for high energy propellants, the ability to cast these compositions satisfactorily at relatively low temperatures is a tremendously important safety factor. After casting, the monomeric compound is reacted to form a polymer, which polymer, as hereinbefore set forth, functions as a binder for the entire propellant charge.

As set forth in Serial No. 783,614, now abandoned and in Serial No. 851,935, filed November 3, 1959, which is a continuation-in-part of Serial No. 783,614, polymerizable monomers containing high boron content are of value as high energy binders for propellants. The subject matter of these applications is incorporated herein by reference. While it is necessary that the binders employed impart the necessary physical properties to the propellant grain, it is also necessary that the chemical composition of the polymers employed as binders be such that they do not detract from the specific impulse of the propellant. Typical of such polymerizable monomers which impart the desired physical properties to propellant grains and which do not detract from the specific impulse of propellant grains are the acrylate and methacrylate esters of the carbinols of the present invention. These esters can be conveniently prepared by reacting the acid halides of the acids with the carbinols of the present invention, preferably in the presence of a trialkylamine such as triethylamine.

Propellant compositions are prepared from such boron-containing polymerizable esters by mixing them with an oxidizer, frequently ammonium perchlorate, and adding a peroxide type polymerization catalyst thereto. Other additives such as powdered metals, such as aluminum, plasticizers, such as nitrato esters of mono- and poly-hydric alcohols, or stabilizers may be added. When the mixture is uniform, it is cast into a motor casing and cured.

The nitrato esters of the carbinols of the present invention are also of value as plasticizers for propellant grains. Some of the polymers which are otherwise suitable as binders for propellant grains are too hard or brittle when unplasticized to impart the desired toughness to the completed propellant. Many of such polymers can be plasticized to the desired physical state with commonly used plasticizers, such as dibutyl phthalate, dioctyl sebacate, etc., but compounds such as these detract appreciably from the specific impulse of the propellant.

The nitrato esters of the carbinols of the present invention not only function as efficient plasticizers for the polymers but, because of the presence of the high energy nitrato group or groups, do not detract as much from the specific impulse of the propellant. The nitrato esters are prepared by reacting the carbinol with 85 to 100% nitric acid at a temperature of from about −10° C. to about 30° C. The nitric acid is freed from oxides of nitrogen before use by blowing with air, and urea, about 1 to 2 grams per 100 grams of nitric acid is added. A solvent is generally employed, chlorinated hydrocarbons being particularly suitable. A typical solvent of this class is methylene chloride. The reaction mixture is diluted with 1 to 5 volumes of water to remove the nitric acid, the solvent layer being washed with water or dilute caustic until acid-free, dried over a desiccant such as magnesium sulfate, and the solvent removed by distillation.

The preferred secondary carbinols of the present invention are carbinols with high boron content and are represented by the formulas

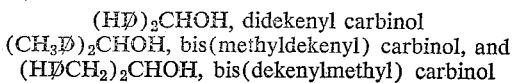

in which —ϕ— represents

Compounds of the formula $(R\phi)_2CHOH$ in which R is alkyl or aryl and other than H or $CH_3$ can be easily prepared by using acetylenes other than acetylene or methyl acetylene for the reaction with decaborane derivatives to produce the corresponding substituted dekene. Thus, phenyl acetylene gives phenyl dekene which, when reacted with phenyllithium, gives lithium phenyldekene.

If two moles of lithium phenyldekene are treated with one mole of ethyl formate, bis(phenyldekenyl) carbinol results. In a similar fashion, other alkyl and aryl substituted dekenyl) carbinols can be prepared.

For use in the preparation of compounds for use in the production of propellants and explosive compositions, it is generally preferred that the boron content of the carbinol be as high as possible. Thus, the three secondary carbinols set forth hereinbefore by name and formula are the preferred compounds.

The compound of the empirical formula $C_2B_{10}H_{12}$ is called "dekene" and, thus, the origin of the nomenclature for the carbinols. The compound dekene, as set forth hereinbefore, has also been called "vinylene decarborane," but this trivial name does not describe the actual structure of the compound and is actually an incorrect attempt to describe the compound. Dekene in also known as "carborane."

These hydroxy dekenyl compounds can be prepared by a number of methods. Thus, bis(dekenylmethyl) carbinol can be prepared by reacting dekenylmethyl bromide, prepared as hereinafter set forth, with magnesium to form the Grignard complex ($H\psi CH_2MgBr$) and reacting two moles of the Grignard complex with ethyl formate to form the carbinol. Didekenyl carbinol can be prepared by reacting acetylene with decaborane derivatives to form dekene, treating the dekene with phenyllithium to form the lithium dekene, and treating two moles of lithium dekene with one mole of ethyl formate to form didekenyl carbinol. Didekenyl carbinol can also be prepared by treating the acetate of diethinyl carbinol with decaborane and reducing the acetate of didekenyl carbinol so formed. Bis(methyldekenyl) carbinol can be prepared by treating methyl dekene with phenyllithium to form lithium methyldekene, and treating two moles of lithium methyldekene with one mole of ethyl formate to form the carbinol.

As set forth hereinbefore, there are three different methods of preparing the carbinols of the present invention, namely, the use of the Grignard of the desired dekene derivative with an alkyl formate, the use of the lithium derivative of the desired dekene derivative with an alkyl formate and the addition of decaborane to acetylenic alcohols, the hydroxyl group being protected by esterification prior to reaction with the decaborane. Actually, from a chemical standpoint, the Grignard and lithium reactions are substantially the same, and for the carbinols of the present invention, the lithium process is preferred because of ease of handling, etc. The addition of decarborane to the acetylenic alcohols is the preferred method, but is frequently limited because of the limited availability of a wide range of acetylenic alcohols.

Although the dekene and substituted dekenes which are precursors of the compounds of the present invention can be made by reacting adducts of decaborane, such as the bis(acetonitrile) adduct with acetylene and substituted acetylenes in solution, the preferred process comprises a one-step process in which the decaborane is reacted with the acetylene or substituted acetylene in the presence of acetonitrile. Another solvent can be used if desired, but it is not necessary. The reaction is conducted at the reflux temperature of the reaction mixture which, if acetonitrile is used as the sole solvent, is approximately 80° to 85° C. Other inert solvents, such as toluene, can be used and when toluene is employed, the reflux temperature of the reaction mixture is in the range of 105° to 115° C. Propionitrile can also be used as a solvent, but the use of acetonitrile as solvent represents the preferred embodiment.

The molar ratio of decarborane to the acetylene or substituted acetylene can be varied appreciably without affecting the composition of the products produced. Thus, the molar ratio may vary from about 1.5 to 1 to about 1 to 1.5. However, for best yield based on the weight of both reactants, using acetonitrile as solvent, the molar ratio should be 1 to 1. When employing this reaction mixture, the preferred molar ratio of decaborane to acetylene or substituted acetylene to acetonitrile is 1:1:2.

The reaction time required will vary with the particular acetylene used and with the reaction conditions employed. With the 1:1:2 molar ratio set forth hereinbefore, and a temperature in the range of 80° to 115° C., a reaction time of 10 to 25 hours has been found to be satisfactory.

Although other methods of recovering the reaction product will be obvious to those skilled in the art, the preferred method employed consists in cooling the reaction to room temperature and removing by filtration any solid which precipitates, removing the solvent from the filtrate by distillation, washing the residue with 10% aqueous sodium hydroxide solution, and finally extracting the residue with pentane. The product remaining can be recrystallized from ethanol-water or pentane, but this procedure is not generally necessary since the products are obtained in a degree of purity satisfactory for most of the uses for which the products are intended.

Compounds of the formula $R-C \equiv CH$ which have been found to be suitable include acetylene, methyl acetylene, monochloroacetylene monobromoacetylene, mono(bromomethyl)acetylene, mono(chloromethyl)acetylene, phenylacetylene, p-bromophenylacetylene, m-bromophenylacetylene, p-nitrophenylacetylene. Substituted acetylenes containing unsaturation in addition to the acetylenic bond can also be satisfactorily used. Thus, the interaction of isopropenylacetylene, decaborane and acetonitrile produced isopropenyldekene.

The dekenyl lithium compounds are prepared by reacting a hydrocarbon lithium compound with the dekene. Thus, alkyllithium compounds, such as propyllithium and butyllithium, are satisfactory. Aryllithium compounds represent the preferred type but, in general, any hydrocarbon lithium compound can be used. Typical aryllithium compounds include diphenylmethane lithium, trityl-(i.e., triphenylmethane)lithium, fluorenyllithium and naphthalyllithium. Phenyllithium represents a particularly preferred lithium compound.

PREPARATION OF INTERMEDIATES

The diethinyl carbinol was prepared by the method of Jones (J. Chem. Soc. 1956, 4765) and the information herein is incorporated herein by reference. We have substituted methyl formate and propargyl aldehyde for the ethyl formate (Reaction 3) to give the carbinol in similar yields (40–45%).

*Diethinyl carbinyl acetate* [$(HC \equiv C)_2 CHOCOCH_3$].— To a 200 ml. three-necked flask fitted with mechanical stirrer, reflux condenser with protective Drierite drying tube and dropping funnel was introduced 15.0 grams (0.1875 mole) diethinyl carbinol, 17.0 grams (0.215 mole) pyridine and 100 ml. dry ether. The reaction mixture was cooled to 0–5° C. using an ice-water bath. To the mixture was added 16.0 grams (0.204 mole) acetyl chloride at such a rate that the temperature was maintained below 10° C. The reaction was then completed by allowing it to stand for a period of three hours at room temperature. The reaction mixture was washed with water and extracted with ether. The ether extracts were combined and dried over anhydrous magnesium sulfate. After removal of the ether, the liquid residue was vacuum distilled. A product, B.P. 39–40° C. (2–3 mm.), $n_D^{20}$ 1.4426 was collected. Its infrared spectrum and elemental analysis were consistent for the desired product, diethinyl carbinyl acetate. The yield was 16.4 grams (71.5%).

*Analysis.*—Calculated for $C_7H_6O_2$: C, 68.75; H, 9.92. Found: C, 68.88; H, 5.33.

*Preparation of dekenylmethyl bromide.*—Into a 3-liter, three-necked, roud-bottom flask equipped with a condenser, mechanical stirrer, dropping funnel, and a gas exit bubbler was placed a solution of 245 grams (2.0 moles) of decaborane in 2 liters of dry acetonitrile. The solution was brought to reflux and 304 grams (2.55 moles) of propargyl bromide was added dropwise over a forty-five minute period. Refluxing was continued for an additional three and one-half hours. A slight amount of turbidity developed at the end of this time. The majority of the acetonitrile was distilled off under reduced pressure and the resulting viscous, brown liquid was treated with approximately 500 cc. of 10% NaOH and extracted three times with 500 cc. portions of pentane. The combined extracts were again washed with 200 cc. of 10% NaOH. After drying over anhydrous magnesium sulfate and filtering, the pentane was removed under reduced pressure resulting in 420 grams of a slightly yellow viscous liquid which crystallized on standing, representing an 87.8% yield based on decaborane. This material could be purified either by molecular distillation under high vacuum or by recrystallization from pentane. For most purposes, the product obtained was of sufficient purity for use in subsequent reactions such as the formation of the corresponding Grignard reagent. A recrystallized sample of this material gave a M.P. of 36° to 37° C.

*Analysis.*—Calculated for $C_3H_{15}B_{10}Br$: C, 22.81; H, 5.74; B, 41.10. Found: C, 23.50; H, 5.20; B, 40.91.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

*Example I*

*The preparation of bis(dekenylmethyl)carbinol.*—A solution of 24 grams of bromomethyl dekene in 150 ml. of dry diethyl ether was added under nitrogen to 2.5 grams of magnesium. The reaction mixture was refluxed and stirred for 30 minutes. A solution of 3.7 grams of ethyl formate and 25 ml. of dry ether was added dropwise. The reaction mixture was refluxed and stirred for 2 hours. It was poured into ice water and acidified with dilute hydrochloric acid. The neutral layer was separated, washed with water, dried over magnesium sulfate and the solvent removed. Pentane was added to the solid residue which was floated off and air-dried. Weight, of bis(dekenylmethyl) carbinol, 15.3 grams, 88% yield, M.P. above 300°. An analytical sample was recrystallized from a methylene chloride-pentane mixture.

*Analysis.*—Calculated for $C_7H_{32}B_{20}O$: C, 24.11; H, 9.26; B, 62.05. Found: C, 24.74; H, 8.53; B, 59.43.

*Example II*

*Reaction of diethinyl carbinyl acetate with decaborane in acetonitrile.*—To a 100 ml. three-necked flask fitted with magnetic stirrer, reflux condenser, gas inlet and dropping funnel (all outlets covered with Drierite drying tubes) was introduced 60 ml. dry acetonitrile adn 6.0 g. (0.0491 mole) decaborane. The reaction mixture was flushed with dry nitrogen during the reaction. After heating to reflux (0.0245 mole), 3.0 g. diethinyl carbinyl acetate was added slowly through the dropping funnel and the reaction was allowed to continue at reflux for a period of 5½ hours. The excess acetonitrile was removed on a rotary stripper and the residue neutralized with cold 10% sodium hydroxide (50 ml.). The aqueous layer was then placed in a liquid-liquid extractor and extracted with pentane for a period of 72 hours. The pentane solution was dried over anhydrous magnesium sulfate followed by removal of the pentane on a rotary stripper to give 5.73 g. (65.5%) of a liquid residue. The infrared spectrum of this product indicated the carboranyl ester.

*Analysis.*—Calculated for $C_7H_{30}B_{20}O_2$: percent B, 59.67. Found: percent B, 58.6.

*Reduction of didekenyl carbinyl acetate with lithium aluminum hydride.*—To a solution of 3.8 g. (0.1 mole) lithium aluminum hydride in 100 ml. of anhydrous ether contained in a 300 ml. three-necked flask fitted with magnetic stirrer, reflux condenser and dropping funnel (all outlets covered with Drierite drying tubes) was added dropwise 14.38 g. (0.0394 mole) dicarboranyl carbinyl acetate in 50 ml. anhydrous ether at such a rate that the reaction mixture was maintained at a gentle reflux. The reaction was continued with stirring for a period of two hours at ambient temperature. Methanol was added to remove the excess lithium aluminum hydride and the mixture was poured over cracked ice hydrochloric acid (100 g./25 ml.). The ether layer was separated and the aqueous layer extracted with three 50 ml. portions of ether. The ether extracts were combined with the original ether layer and the total ether solution washed with water followed by drying over anhydrous magnesium sulfate. Removal of the ether left a viscous residue. The oily residue was dissolved in pentane and cooled to precipitate 11.6 g. (92%) of a white crystalline solid, didekenyl carbinol, M.P. 185–187° C. The infrared spectrum of this solid was consistent for that of didekenyl carbinol.

*Analysis.*—Calculated for $C_5H_{28}B_{20}O$: percent C, 18.75; percent H, 8.75; percent B, 67.50. Found: percent C, 19.61; percent H, 8.47; percent B, 66.69.

To an ether solution of 6.4 g. (0.04 mole) of methylcarborane was added 33 cc. of 1.23 N phenyllithium in dropwise fashion. The mixture was allowed to stir at room temperature for one hour and 1.58 g. (0.02 mole) of ethyl formate in ether solution was added dropwise. After the mixture had been heated at the reflux temperature for one hour, it was stirred at room temperature overnight and then decomposed with saturated ammonium chloride solution. Separation of the layers was followed by drying and evaporation of the ether layer. A solid, 7.55 g., was obtained. Sublimation in vacuo provided 3.33 g. of a mixture of biphenyl and methylcarborane. Recrystallization of the residue from hexane-ether gave 3.45 g. (40% yield) of a solid, M.P. 175–177; whose infrared suggests the structure bis-methylcarboranyl carbinol.

*Analysis.*—Calculated for $B_{20}H_{32}C_7O$: B, 62.05; C, 24.11; H, 9.25. Found: B, 61.88; C, 26.86; H, 8.88.

We claim:

1. A carbinol selected from the group consisting of $(H\phi)_2CHOH$, didekenyl carbinol
   $(CH_3\phi)_2CHOH$, bis(methyldekenyl) carbinol, and
   $(H\phi CH_2)_2CHOH$, bis(dekenylmethyl) carbinol in which —$\phi$— represents the empirical formula

—$C_2B_{10}H_{10}$—

2. Didekenyl carbinol, $(H\phi)_2CHOH$ in which —$\phi$— represents

—$C_2B_{10}H_{10}$—

3. Bis(methyldekenyl) carbinol, $(CH_3\phi)_2CHOH$ in which —$\phi$— represents

—$C_2B_{10}H_{10}$—

4. Bis(dekenylmethyl) carbinol, $(H\phi CH_2)_2CHOH$ in which —$\phi$— represents

—$C_2B_{10}H_{10}$—

5. A method for the preparation of didekenyl carbinol which comprises reacting acetylene with decaborane to form dekene, reacting the dekene with phenyl lithium to form lithium dekene, reacting two moles of lithium dekene with one mole of ethyl formate and recovering the didekenyl carbinol so formed.

6. A method for the preparation of bis(methyldekenyl) carbinol which comprises reacting methyl dekene with phenyllithium, reacting two moles of lithium methyldekene with one mole of ethyl formate and recovering the bis(methyldekenyl) carbinol so formed.

7. A process for the preparation of secondary carbinols of the formula (R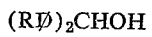)$_2$CHOH in which R is selected from the group consisting of hydrogen and methyl, and —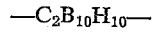— represents

—$C_2B_{10}H_{10}$— which comprises reacting $RC_2B_{10}H_{11}$, in which R is as previously defined, with phenyllithium to form $RC_2B_{10}H_{10}Li$ and reacting two moles of $RC_2B_{10}H_{10}Li$ with one mole of ethyl formate and recovering the (R⌀)$_2$CHOH so formed.

No references cited.